US011636271B2

(12) United States Patent
Kobayashi et al.

(10) Patent No.: US 11,636,271 B2
(45) Date of Patent: Apr. 25, 2023

(54) DIALOGUE APPARATUS, METHOD AND NON-TRANSITORY COMPUTER READABLE MEDIUM

(71) Applicant: KABUSHIKI KAISHA TOSHIBA, Tokyo (JP)

(72) Inventors: Yuka Kobayashi, Seto Aichi (JP); Kenji Iwata, Machida Tokyo (JP); Takami Yoshida, Kamakura Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 205 days.

(21) Appl. No.: 17/186,667

(22) Filed: Feb. 26, 2021

(65) Prior Publication Data
US 2022/0075959 A1 Mar. 10, 2022

(30) Foreign Application Priority Data
Sep. 10, 2020 (JP) .............................. JP2020-152168

(51) Int. Cl.
*G06F 40/35* (2020.01)
*G06F 16/33* (2019.01)
*G06F 16/332* (2019.01)
*G06F 40/279* (2020.01)

(52) U.S. Cl.
CPC ............ *G06F 40/35* (2020.01); *G06F 16/334* (2019.01); *G06F 16/3329* (2019.01); *G06F 40/279* (2020.01)

(58) Field of Classification Search
CPC .... G06F 40/35; G06F 40/279; G06F 16/3329; G06F 16/3334; G06F 16/334
See application file for complete search history.

(56) References Cited

U.S. PATENT DOCUMENTS

| | | | |
|---|---|---|---|
| 10,395,276 B1 * | 8/2019 | Fulghum ............ G06Q 30/0257 |
| 10,853,337 B2 | 12/2020 | Barber et al. |
| 10,853,387 B2 * | 12/2020 | Saeki ....................... G06F 16/90 |
| 2002/0156776 A1 * | 10/2002 | Davallou ................ G06F 16/30 |
| 2006/0074892 A1 * | 4/2006 | Davallou ................ G06F 16/30 |
| 2007/0136251 A1 * | 6/2007 | Colledge ............. G06F 16/3322 |

(Continued)

FOREIGN PATENT DOCUMENTS

| CN | 111046141 A | * | 4/2020 | |
|---|---|---|---|---|
| EP | 3800559 A1 | * | 4/2021 | ......... G06F 16/2246 |

(Continued)

*Primary Examiner* — Anne L Thomas-Homescu
(74) *Attorney, Agent, or Firm* — Knobbe, Martens, Olson & Bear LLP

(57) ABSTRACT

According to one embodiment, a dialogue apparatus includes a processing circuit. The processing circuit designates one database from among a plurality of databases. The processing circuit extracts a keyword from text information. The processing circuit searches the designated database and another database which is included in the plurality of databases and which is other than the designated database, by using the keyword. The processing circuit generates a response in accordance with a first number of hit items, which is a number of data items matching the keyword in the designated database, and a second number of hit items, which is a number of data items matching the keyword in said another database.

18 Claims, 6 Drawing Sheets

(56) References Cited

U.S. PATENT DOCUMENTS

| | | | | |
|---|---|---|---|---|
| 2009/0248674 A1* | 10/2009 | Suzuki | ............... | G06F 16/9535 |
| | | | | 707/999.005 |
| 2010/0169304 A1* | 7/2010 | Hendricksen | ......... | G06F 16/319 |
| | | | | 707/723 |
| 2010/0192064 A1* | 7/2010 | Beppu | .................... | G06Q 30/02 |
| | | | | 715/710 |
| 2011/0264657 A1* | 10/2011 | Hoffman | ................. | H04L 67/51 |
| | | | | 707/769 |
| 2018/0101616 A1* | 4/2018 | Ma | ....................... | G06F 16/9536 |
| 2021/0216540 A1* | 7/2021 | Bansal | .................. | G06F 16/156 |
| 2021/0240786 A1* | 8/2021 | Pendse | ................. | G06F 16/954 |
| 2021/0390251 A1* | 12/2021 | Swvigaradoss | ....... | G06F 40/174 |

FOREIGN PATENT DOCUMENTS

| | | | | |
|---|---|---|---|---|
| JP | | 6159908 | | 6/2017 |
| JP | | 6580737 | | 8/2018 |
| JP | | 2018-206070 | | 12/2018 |
| WO | WO-2019022669 A1 * | 1/2019 | ......... | G06F 21/6218 |

\* cited by examiner

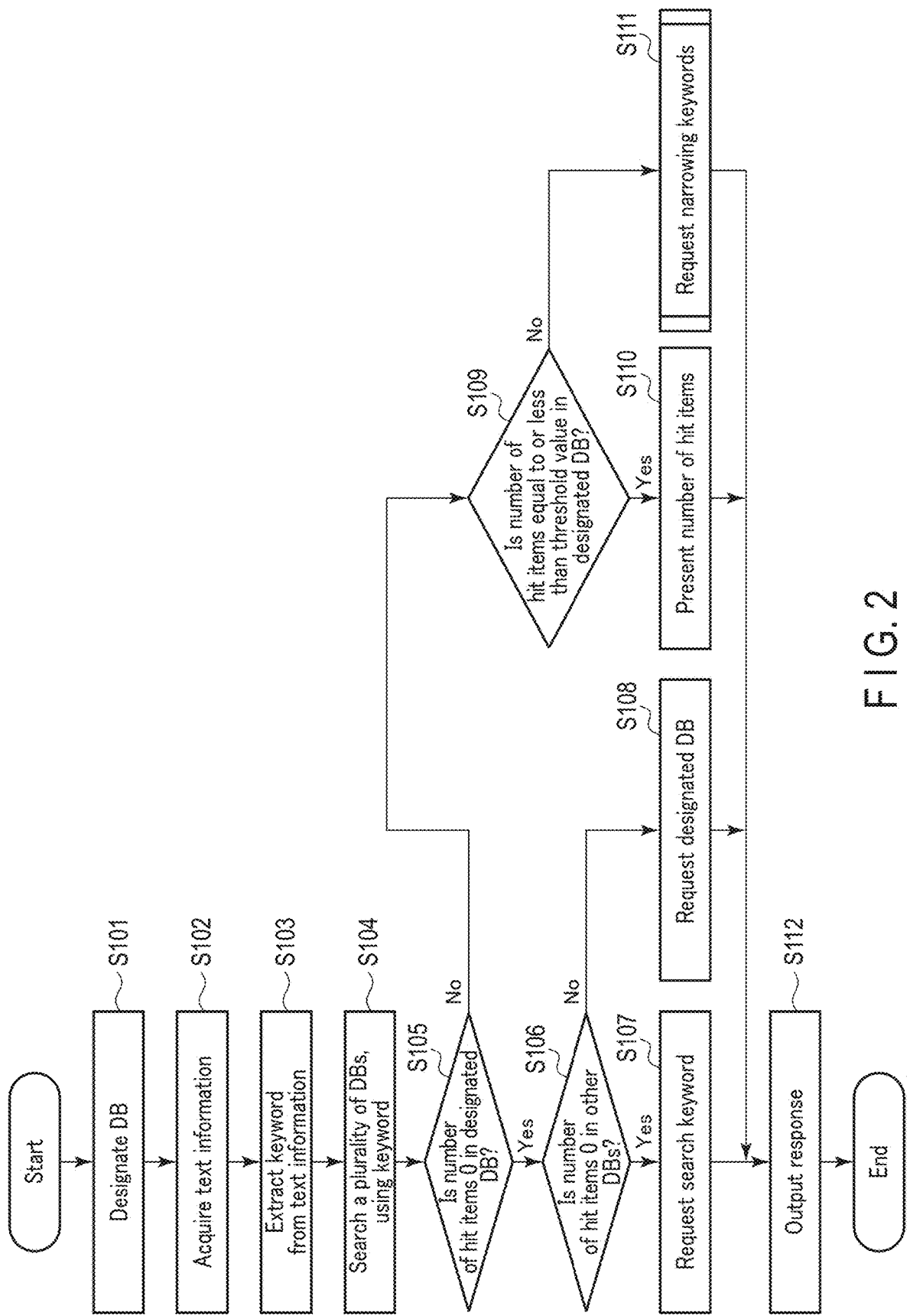
F I G. 2

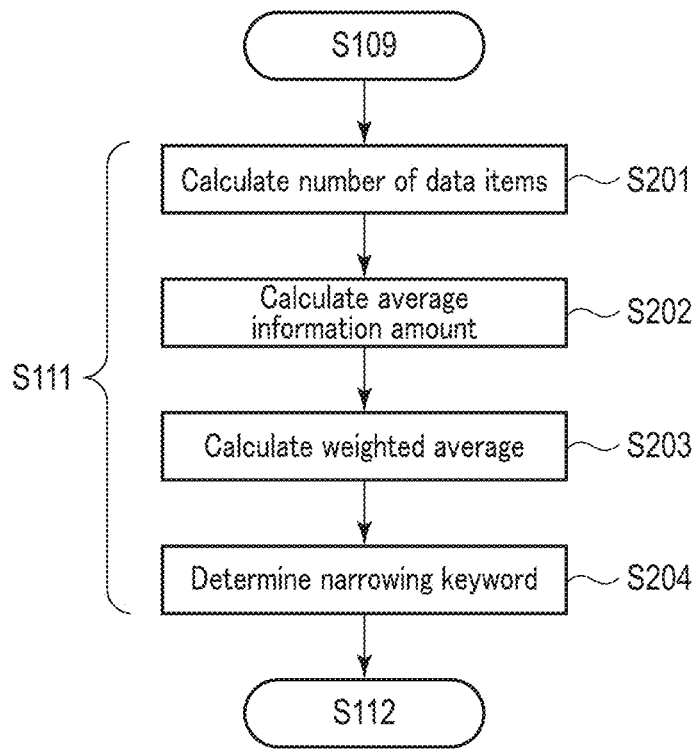
F I G. 3
| Part ID | Part name | Model number |
| --- | --- | --- |
| 0001 | Resistor | ABC |
| 0002 | Capacitor | GHI |
| 0003 | Capacitor | ABC |
| 0004 | Transistor | DEF |
| 0005 | Resistor | DEF |
| 0006 | Transistor | ABC |
| 0007 | Resistor | ABC |
| 0008 | Resistor | GHI |
| 0009 | Capacitor | DEF |
| ... | ... | ... |
F I G. 4

|  | Part name | | | Model number | | |
|---|---|---|---|---|---|---|
|  | Resistor | Capacitor | Transistor | ABC | DEF | GHI |
| Database A | 20 | 20 | 20 | 30 | 10 | 20 |
| Database B | 80 | 5 | 5 | 20 | 40 | 30 |
| Database C | 50 | 10 | 10 | 40 | 20 | 10 |

300

F I G. 5

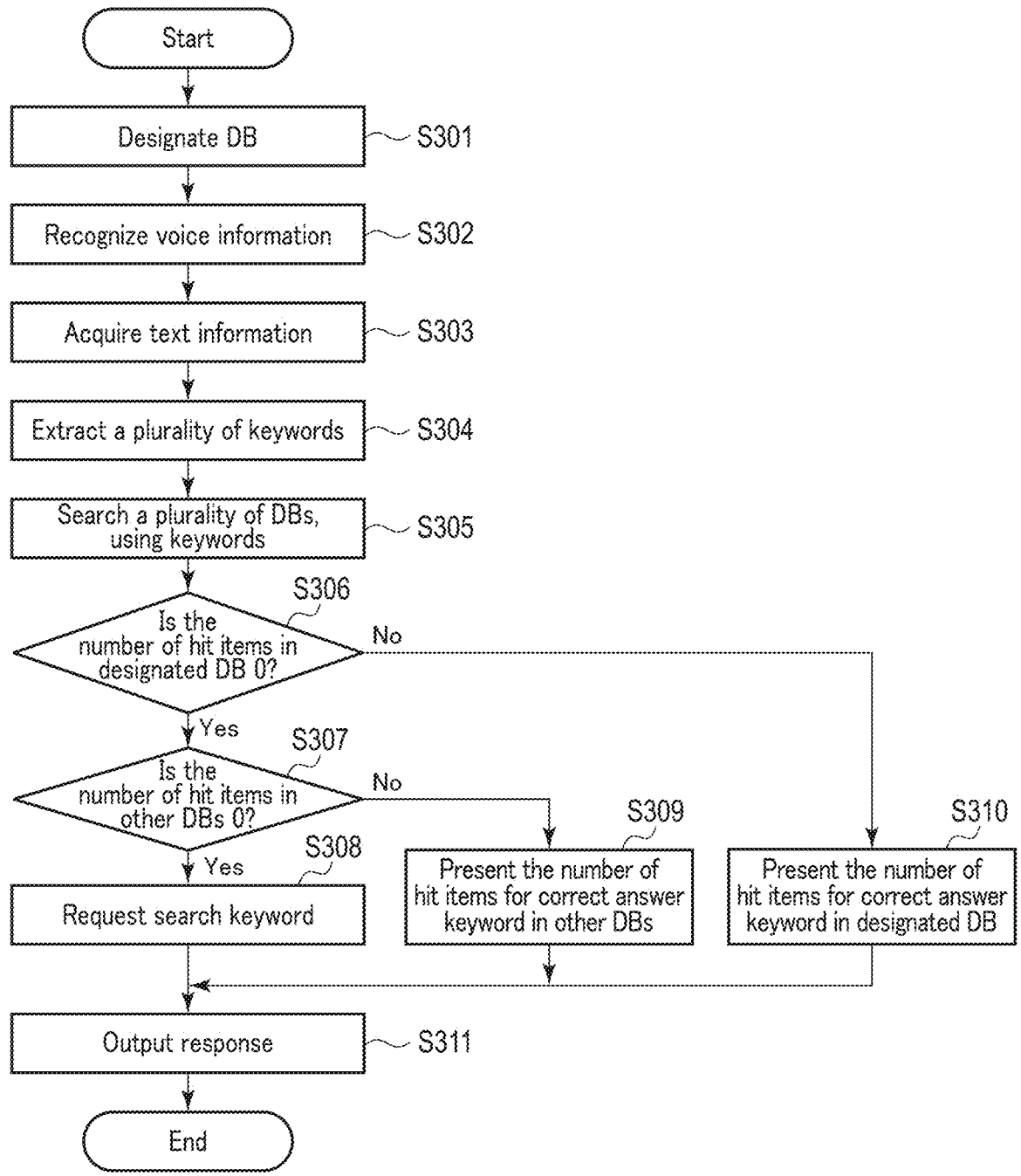
F I G. 7

DIALOGUE APPARATUS, METHOD AND NON-TRANSITORY COMPUTER READABLE MEDIUM

CROSS-REFERENCE TO RELATED APPLICATIONS

This application is based upon and claims the benefit of priority from Japanese Patent Application No. 2020-152168, filed Sep. 10, 2020, the entire contents of which are incorporated herein by reference.

FIELD

Embodiments described herein relate to a dialogue apparatus, method and non-transitory computer readable medium.

BACKGROUND

In general, a dialogue apparatus extracts a search keyword necessary for search from text information, such as a natural sentence input by the user, searches a database using the extracted search keyword, and outputs a response to the user in accordance with a search result. The database to be searched is a single database or includes a plurality of databases. For example, it includes a single database in which a plurality of database functions are integrated, or includes a plurality of databases which are independent of each other. Specifically, the dialogue apparatus searches one or more databases designated by the user.

First, where the dialogue apparatus searches one designated database, it cannot output a response in consideration of search results obtained with other databases that are not designated. For example, if the number of hit items obtained with a specific database in response to a certain search keyword is 0, then the dialogue apparatus cannot perform further searches, and other search keywords or other databases that should be used to narrow down the number of hit items cannot be presented. Second, where the dialogue apparatus searches a plurality of designated databases, the dialogue apparatus cannot determine which search results obtained with the plurality of databases should be preferentially used in a response it outputs. Therefore, there is a demand for a dialogue apparatus that preferentially uses search results obtained with one designated database and that outputs a response in which those search results and search results obtained with other undesignated databases are integrated.

BRIEF DESCRIPTION OF THE DRAWINGS

FIG. 2 is a flowchart showing an operation example of the dialogue apparatus according to the first embodiment.

FIG. 3 is a flowchart showing details of how a narrowing keyword is determined.

FIG. 4 is a diagram showing an example of a data table stored in a plurality of databases.

FIG. 5 is a diagram showing an example of the number of data items obtained in a plurality of databases.

FIG. 7 is a flowchart showing an operation example of the dialogue apparatus according to the second embodiment.

DETAILED DESCRIPTION

In general, according to one embodiment, a dialogue apparatus includes a processing circuit. The processing circuit designates one database from among a plurality of databases. The processing circuit acquires text information input by a user. The processing circuit extracts a search keyword required for search from the text information. The processing circuit searches the designated database and another database which is included in the plurality of databases and which is other than the designated database, by using the search keyword. The processing circuit generates a response in accordance with a first number of hit items, which is a number of data items matching the search keyword in the designated database, and a second number of hit items, which is a number of data items matching the search keyword in said another database. The processing circuit outputs the generated response to the user.

Hereinafter, a dialogue apparatus, a method and a non-transitory computer readable medium according to the present embodiment will be described with reference to the accompanying drawings. In the embodiments described below, elements assigned with the same reference symbol perform the same operation, and a redundant description of such elements will be omitted as appropriate. A description will now be given of one embodiment with reference to the drawings.

First Embodiment

Figure 1:
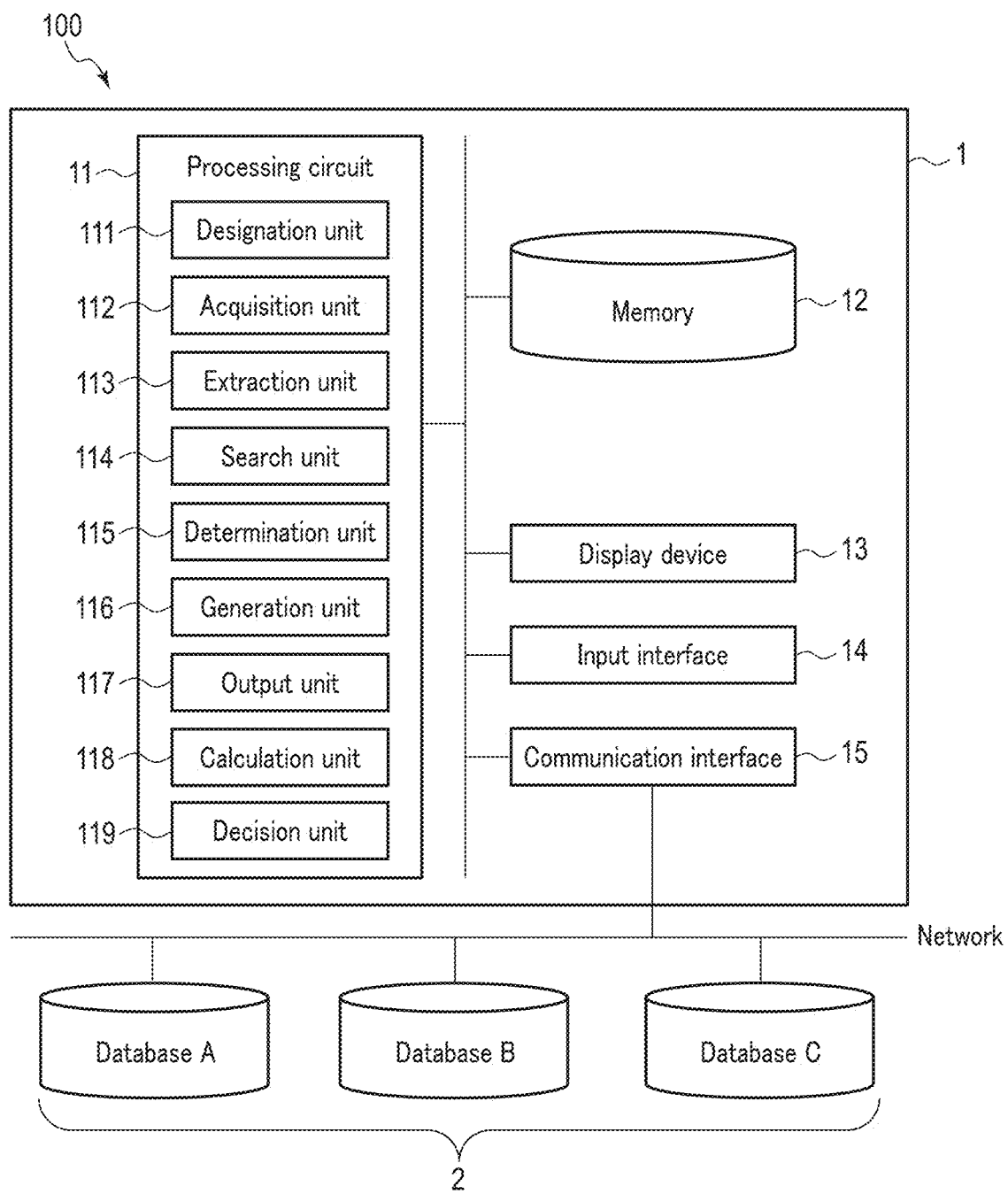
FIG. 1 is a block diagram showing a configuration example of a dialogue apparatus according to a first embodiment.

A configuration example of the dialogue apparatus 1 according to the first embodiment will be described with reference to FIG. 1.

The dialogue apparatus extracts a search keyword necessary for search from text information, such as a natural sentence input by the user, searches a plurality of databases 2 using the extracted search keyword, and outputs a response to the user in accordance with a search result. Specifically, the dialogue apparatus 1 is a task-oriented dialogue apparatus. It may be hardware provided for a server and dedicated to dialogue, or may be software such as an application program. In the present embodiment, the dialogue apparatus 1 includes a processing circuit 11, a memory 12, a display device 13, an input interface 14 and a communication interface 15. These elements are communicably coupled to each other via a bus. It should be noted that each element does not have to be individual hardware. For example, at least two of the elements may be integrated as one hardware element.

The dialogue apparatus 1 is communicably coupled to a plurality of databases 2 via a network. The entire system, including the dialogue apparatus 1, the databases 2 and the network, is also referred to as a dialogue system 100.

The processing circuit 11 controls the operation of the dialogue apparatus 1. The processing circuit 11 includes hardware processors, such as a CPU (Central Processing Unit), an MPU (Micro Processing Unit), a GPU (Graphics Processing Unit) and an FPU (Floating Point Unit). By executing programs expanded in the memory 12 by means of a processor, the processing circuit 11 causes the elements (a designation unit 111, an acquisition unit 112, an extraction unit 113, a search unit 114, a determination unit 115, a generation unit 116, an output unit 117, a calculation unit 118 and a decision unit 119) corresponding to the programs to function. It should be noted that each element does not have to be a processing circuit consisting of a single processor. For example, the elements may be realized by a processing circuit that combines a plurality of processors.

The designation unit 111 designates one database from among a plurality of databases.

The acquisition unit 112 acquires text information input by the user.

The extraction unit 113 extracts a search keyword necessary for search from the text information.

The search unit 114 searches the designated database and other databases other than the designated database, by using the search keyword.

The determination unit 115 determines authenticity of various propositions.

The generation unit 116 generates a response in accordance with a first number of hit items, which is the number of data items matching the search keyword in the designated database, and a second number searches, which is the number of data items matching the search keyword in the other databases.

The output unit 117 outputs the generated response to the user.

The calculation unit 118 calculates an average information (entropy) amount for each of data items in each of the data tables included in the databases. Further, the calculation unit 118 calculates a weighted average for the average information amount of each of the data items, by using weights determined for the respective databases.

The decision unit 119 selects a data item having the largest weighted average of the average information amount from among the plurality of data items and uses that data item as a narrowing keyword.

The memory 12 stores information, such as data and programs used by the processing circuit 11. The memory 12 includes, as hardware, a semiconductor memory element, such as a RAM (Random Access Memory). The memory 12 may be a drive device that reads and writes information to and from an external storage device, such as a magnetic disk (a floppy™ disk or a hard disk), a magneto-optical disk (MO), an optical disk (CD, DVD or Blu-ray™), a flash memory (a USB flash memory, a memory card or an SSD) or a magnetic tape. The storage area of the memory 12 may be inside the dialogue apparatus 1 or may be in the external storage device.

The display device 13 displays information, such as data generated by the processing circuit 11 and data stored in the memory 12. As the display device 13, for example, a display such as a cathode ray tube (CRT) display, a liquid crystal display (LCD), a plasma display, an organic electro-luminescence display (OELD) or a tablet terminal can be used.

The input interface 14 receives an input from a user who uses the dialogue apparatus 1, converts the received input into an electric signal and outputs the electric signal to the processing circuit 11. As the input interface 14, a physical operation device, such as a mouse, a keyboard, a trackball, a switch, a button, a joystick, a touch pad, a touch panel display, or a microphone, can be used. The input interface 14 may be replaced with a device that receives an input from an external input device separate from the dialogue apparatus 1, converts the received input into an electric signal and outputs the electric signal to the processing circuit 11.

The communication interface 15 transmits and receives data to and from the database 2 via a network. An arbitrary communication standard can be used for the communications between the communication interface 15 and the external device.

The database 2 stores various kinds of data. The database 2 may be implemented, for example, as a data file stored in a server. In the present embodiment, the database 2 includes a plurality of relational databases (RDBs), and each of the plurality of databases 2 includes a data table in which a plurality of data items related to a search keyword are defined. The database 2 includes, for example, database A, database B and database C. It is assumed that the database 2 is searched by a query defined by a database language such as SQL (Structured Query Language).

An operation example of the dialogue apparatus according to the first embodiment will be described with reference to FIG. 2.

In step S101, the designation unit 111 designates one database from among a plurality of databases 2. For example, the dialogue apparatus 1 accepts an instruction which the user input by means of the input interface 14, such as a keyboard, and specifies a database corresponding to the instruction. The dialogue apparatus 1 may specify a default database, or may automatically specify a database according to a user's profile or the like. That is, an arbitrary method can be used as the database specifying method. It is assumed that the designated database is retained and the inquiry is not made again until the dialogue is completed.

In step S102, the acquisition unit 112 acquires text information input by the user. For example, the dialogue apparatus 1 acquires text information that is input by the user via the input interface 14, such as a keyboard (key input), a touch pad and a touch panel display (input by handwriting recognition), a microphone such as a headset and an AI speaker (input by voice recognition). The acquired text information is stored in the memory 12.

In step S103, the extraction unit 113 extracts a search keyword necessary for search from the text information. As the first extraction method used for extraction of the search keyword, a list including a plurality of keywords to be extracted may be prepared. In this case, if the acquired text information includes any of the keywords in the list, that keyword is extracted. The first extraction method prepares a plurality of keywords such as "resistor", "capacitor" and "transistor." If the acquired text information is "Look for a resistor", the "resistor" is included in the text information, so that the "resistor" is extracted.

As the second extraction method, a list of a plurality of sentences including a keyword to be extracted is prepared. In this case, if the acquired text information includes a sentence in the list, a keyword included in that sentence is extracted. In the second extraction method, a plurality of sentences, such as "Look for ○○", "Search for ΔΔ", and "Is there □□?", are prepared. If the acquired text information is "Look for a resistor", the "resistor" corresponding ○○ is extracted.

As the third extraction method, a large number of sets of sentences including keywords to be extracted and keywords (labels) to be extracted from the sentences are prepared, and a machine learning model is created using the sets as training data. A keyword can be extracted by use of the machine learning model. In the third extraction method, a plurality of sets of sentences and labels are prepared as training data. For example, a set consisting of the sentence "Look for a resistor" and the label "resistor" corresponding to the sentence, a set consisting of the sentence "Search for a capacitor" and the label "capacitor" corresponding to the sentence, and a set consisting of the sentence "Is there a transistor" and the label "transistor" corresponding to the sentence are prepared as training data. A machine learning model is created by causing a learning model to learn the relationship between the sentences and the labels. If the acquired text information is "Look for a resistor", the "resistor" is extracted based on the learned relationship between the sentence and the label, using the machine learning model. That is, an arbitrary method can be used as the extraction method of a search keyword. The extracted search keyword is stored in the memory 12.

In step S104, the search unit 114 searches the designated database and other databases other than the designated database, by using the search keyword. For example, the dialogue apparatus 1 creates a query defined by SQL, on the basis of the extracted search keywords, and searches a plurality of databases 2. The query is an imperative statement that includes a search keyword, such as "select * from database A where name like % resistor %." A plurality of search results are associated with each searched database and stored in the memory 12. In the present embodiment, it is assumed that a search result is the number of data items matching the search keyword in the database 2.

In step S105, the determination unit 115 determines whether or not the number of data items (first number of hit items) matching the search keyword in the designated database is 0. If it is determined that the number of data items is 0 (Yes in step S105), the process proceeds to step S106. If it is determined that the number of data items is not 0, that is, 1 or more (No in step S105), the process proceeds to step S109.

In step S106, the determination unit 115 determines whether or not the number of data items (second number of hit items) matching the search keyword in other databases that are not designated is 0. If it is determined that the number of data items is 0 (Yes in step S106), the process proceeds to step S107. If it is determined that the number of data items is not 0, that is, 1 or more (No in step S106), the process proceeds to step S108.

In step S107, the generation unit 116 generates a response in which a keyword different from the search keyword is requested. By the time of this step, it is known that the search keyword cannot be used for further searches in the designated database and other databases, so that the dialogue apparatus 1 generates a "reject( )" command. This command indicates that the search keyword cannot be accepted, and is an example of a response in which a different keyword is requested. The generated response is stored in the memory 12.

In step S108, the generation unit 116 generates a response in which a database different from the designated database is requested. By the time of this step, it is known that data can be found by searching another database different from the designated database, so that the dialogue apparatus 1 generates a "request(db)" command. This command is an example of a response in which a newly designated database is requested. The generated response is stored in the memory 12. Alternatively, the dialogue apparatus 1 may generate a response in which the number of hit items in another database is presented.

In step S109, the determination unit 115 determines whether or not the number of data items (first number of hit items) matching the search keyword in the designated database is equal to or less than a threshold value. The threshold value may be an arbitrary value input by the user via the input interface 14, or may be an arbitrary value stored in advance in the memory 12. If it is determined that the value is equal to or less than the threshold value (Yes in step S109), the process proceeds to step S110. If it is determined that the value is not equal to or less than the threshold value, that is, the value is greater than the threshold value (No in step S109), the process proceeds to step S111.

In step S110, the generation unit 116 generates a response in which the number of hit items in the designated database is presented. By the time of this step, it is known that the number of hit items in the designated database is equal to or less than the threshold value, so that the dialogue apparatus 1 generates an "offer(contents)" command. This command is an example of a response in which the number of hit items in the designated database is presented. The generated response is stored in the memory 12.

In step S111, the generation unit 116 generates a response in which narrowing keywords necessary for narrowing down the number of hit items in the designated database are requested. By the time of this step, it is known that the number of hit items in the designated database is larger than the threshold value, so that the dialogue apparatus 1 generates a "request(slot)" command. This command is an example of a response in which data items (referred to as slots as well) for narrowing down the number of hit items is requested. The generated response is stored in the memory 12. The narrowing keywords correspond to data items to be inquired about, and a detailed flow for determining the narrowing keywords will be described later with reference to FIG. 3.

In step S112, the output unit 117 outputs the generated response to the user. For example, the dialogue apparatus 1 outputs the generated command to the display device 13. Since the generated response is information (command) having a format that can be understood by a machine, the dialogue apparatus 1 may convert that response into information (text information) having a format that can be understood by a human and output the converted response. As the first conversion method used for response conversion, a plurality of fixed phrases, such as "The search result of $name$ is $count$", are prepared in the memory 12, and search keywords are filled in the $name$ and the number of hit items are filled in the $count$, for conversion. As the second conversion method, a large number of sets of search keywords, searches and generated sentences are prepared in advance, a machine learning model is generated using the sets as training data, and outputs of the machine learning model may be used. That is, an arbitrary method can be used as the conversion method. Thereafter, the dialogue apparatus 1 outputs a response of text information to the display device 13. Since the user looks at the response output to the display device 13, it can be said that the response is output to the user.

For example, the dialogue apparatus 1 acquires the "reject( )" command generated in step S107 from the memory 12, and a response such as "Search failed. Try search using another keyword" is obtained and output to the display device 13. In addition, the dialogue apparatus 1 acquires the "request(db)" command generated in step S108 from the memory 12, and a response such as "Search failed in the database of the Tokyo office. Please designate the database of another office" is obtained and output to the display device 13. Further, the dialogue apparatus 1 acquires the "offer(contents)" command generated in step S110 from the memory 12, converts it into a response such as "Search results are 10" and outputs the response to the display device 13. Still further, the dialogue apparatus 1 acquires the "request(slot)" command generated in step S111 from the memory 12, converts it into a response such as "Please enter ○○(data item)", and outputs to the display device 13. It should be noted that the slot contains a data item inquired by the dialogue apparatus 1, and if the slot is a voltage, a request(voltage) command is in the slot. In this case, the dialogue apparatus 1 acquires the request(voltage) command from the memory 12, converts it into a response such as "what is the voltage?", and outputs the response to the display device 13.

The order in which to execute the steps shown in this operation example can be changed as appropriate. For example, step S101 may be executed in any stage that is before step S104. Further, the order in which to execute step S105 and step S106 may be reversed.

Details of how narrowing keywords are determined will be described with reference to FIG. 3.

In step S201, the calculation unit 118 calculates the number of data items for each of the data tables included in the respective databases 2. Specifically, the dialogue apparatus 1 calculates the number of data items for the value of each data item in the designated database and other undesignated databases.

For example, it is assumed that the data table 200 shown in FIG. 4 is stored in a plurality of databases 2. The data table 200 stores data related to electrical components, and the data items thereof includes "part ID", "part name" and "model number." The part ID is a serial number assigned to each record, and a value that increases from 0001 in increments of 1 is assigned. The part name is the name of an electrical component and the data values thereof include "resistor", "capacitor" and "transistor." The model number is an identification number unique to each electric component, and the data values thereof include "ABC", "DEF" and "GHI." Even if the part names are the same, the model numbers may be different. Likewise, even if the model numbers are the same, the part names may be different. In addition, the same record may be duplicated. In this manner, the data table 200 stores a plurality of records (data) in which the part name and the model number are associated with each other.

The dialogue apparatus 1 calculates the number of data items whose part name is "resistor", the number of data items whose part name is "capacitor", and the number of data items whose part name is "transistor." Likewise, the dialogue apparatus 1 calculates the number of data items whose model number is "ABC", the number of data items whose model number is "DEF", and the number of data items whose model number is "GHI." The dialogue apparatus 1 performs similar calculation for each of the data tables included in the plurality of databases 2. As a calculation result, the number of data items calculated for each of the plurality of databases 2 is shown in the aggregated data table 300 in FIG. 5.

In step S202, the calculation unit 118 calculates an average information amount of data items for each of the data tables included in the respective databases 2. The average information amount of each data item reflects how the number of each data value in each data item is biased, and the larger the average information amount, the smaller and more even the number of each data value is biased. Due to these properties, a data item having a larger average information amount contains more information, which is useful for narrowing down the number of hit items.

For example, consideration will be given to a case where an average information amount is calculated for each of a plurality of data items in the aggregated data table 300. The average information amount is calculated by the following formula:

[Formula 1]

$$H(S_j) = -\sum_{v_i \in S_j} P(V_i) \log P(V_i) \quad (1)$$

$H(S_j)$ represents an average information amount in a data item (slot) $S_j$. Each data item $S_j$ has a plurality of values $V_i$. $P(V_i)$ is a numerical value obtained by dividing the number of data items related to the value $V_i$ by the total number of data items included in the data item $S_j$.

In the aggregated data table 300, an average information amount of each data item of each of the plurality of databases 2 is calculated as below, based on the formula (1).

$H_A(P_{part\ name})=0.477, H_A(P_{model\ number})=0.439$ $H_B(P_{part\ name})=0.185, H_B(P_{model\ number})=00.461$ $H_C(P_{part\ name})=0.346, H_C(P_{modelnumber})=00.415$ $H_A(P_{part\ name})$ represents an average information amount regarding the data item "part name" of database A.

In step S203, the calculation unit 118 calculates a weighted average for the average information amount of each of the plurality of data items by using weights determined for the respective databases 2. Specifically, the dialogue apparatus 1 determines weights such that the weight for the designated database is larger than the weights for the other databases.

For example, consideration will be given to a case where a weighted average is calculated for the average information amount of each data item in the aggregated data table 300. A weighted average of an average information amount is calculated by the following formula.

(Formula 2)

$$H_{all} = \sum_i W_i H_i \quad (2)$$

$H_{all}$ represents a weighted average of an average information amount. $W_i$ is a weight determined for each of a plurality of databases 2. $W_i$ has a plurality of values, and the sum of the values is 1.

In the aggregated data table 300, a weighted average of the average information amount of each data item is obtained as below, based on the formula (2). It is assumed that the designated database selected from among the plurality of databases 2 is database A, and the other undesignated databases are database B and database C.

$H_{all}(P_{part\ name})=\frac{3}{5}*H_A(P_{part\ name})+\frac{1}{5}*H_B$
$(P_{part\ name})+\frac{1}{5}*H_C(P_{part\ name})=0.392$ $H_{all}(P_{model\ number})=\frac{3}{5}*H_A(P_{model\ number})+\frac{1}{5}*H_B$
$(P_{model\ number})+\frac{1}{5}*H_C(P_{model\ number})=0.439$ The weight $W_A$ of database A is set as ⅗, the weight $W_B$ of database B is set as ⅕, and the weight $W_C$ of database C is set as ⅕.

In S204, the decision unit 119 selects a data item having the largest weighted average of the average information amount from among the plurality of data items and uses that data item as a narrowing keyword. Since the average information amount of each data item increases in accordance with an increase in the equality of the numbers of data items of data values, the data item having a larger average information amount has a high probability of including the data searched by the user. In the above example, $H_{all}$ ($P_{model\ number}$) is larger than $H_{all}(P_{part\ name})$, so that the dialogue apparatus 1 determines the data item "model number" as a narrowing keyword. The narrowing keyword is used in step S112 as a data item (slot) inquired by the dialogue apparatus 1.

According to the first embodiment described above, a response is generated in great consideration of the search results in the database designated by the user and in light of the search results in the other databases. Thus, even if the number of hit items in the designated database is 0, flexible dialogue can be performed in light of the search results in the other databases. In addition, where the number of hit items in the designated database is 1 or more and is larger than the threshold value, a data item to be inquired as a narrowing keyword can be determined by preferential use of the search results in the designated database and in light of the search results of the other databases.

Second Embodiment

Figure 6:
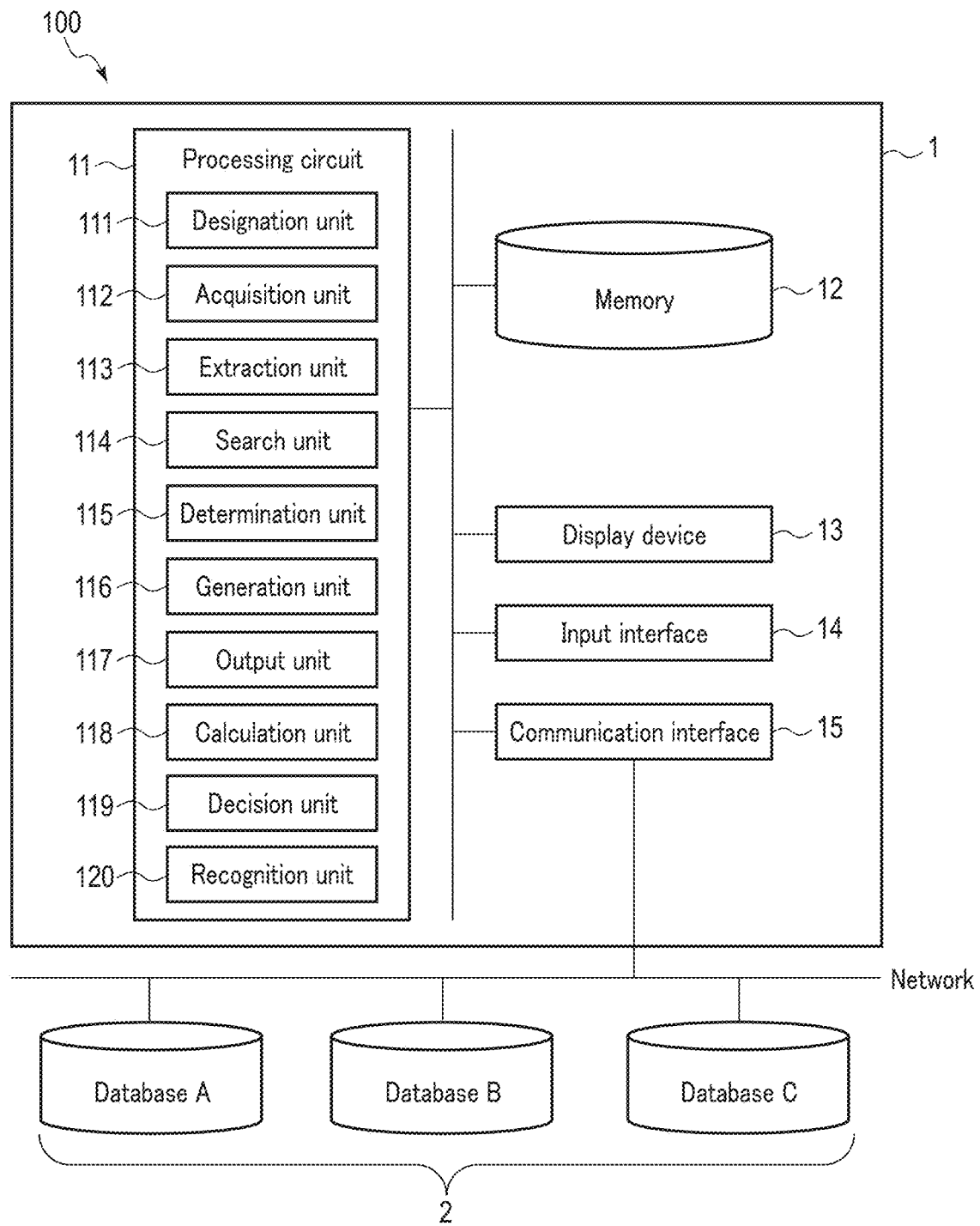
FIG. 6 is a block diagram showing a configuration example of a dialogue apparatus according to a second embodiment.

A configuration example of a dialogue apparatus 1 according to the second embodiment will be described with reference to FIG. 6. In the second embodiment, the dialogue apparatus 1 determines a search keyword (correct answer keyword) closest to user's utterance content from among a plurality of search keywords extracted from voice information uttered by the user. The configuration of the dialogue apparatus 1 according to the second embodiment is similar to that of the first embodiment, except that the processing circuit 11 further includes a recognition unit 120.

The recognition unit 120 recognizes voice information by voice and converts it into text information.

An operation example of the dialogue apparatus according to the second embodiment will be described with reference to FIG. 7.

In step S301, a designation unit 111 designates one database from among a plurality of databases. Step S301 is similar to step S101.

In step S302, the recognition unit 120 recognizes the voice information input by the user by voice and converts it into text information. Specifically, the dialogue apparatus 1 recognizes voice information input by the user by use of an input interface 14 such as a microphone. The voice information is a voice signal reflecting a user's utterance, and is waveform information related to how sound amplitude or frequency changes with time in a certain period of time. For the conversion to text information, existing technology used for general speech recognition processing may be applied. For example, speech recognition based on an acoustic model or a language model may be used. In the present embodiment, the dialogue apparatus 1 converts voice information into text information including a plurality of conversion candidates according to the reliability of voice recognition.

In step S303, an acquisition unit 112 acquires text information obtained by conversion. The acquired text information is stored in a memory 12.

In step S304, an extraction unit 113 extracts a plurality of search keywords from the text information obtained by conversion. Specifically, the dialogue apparatus 1 extracts search keywords corresponding to conversion candidates from the text information including a plurality of conversion candidates. The extracted search keywords are stored in a memory 12.

In step S305, a search unit 114 searches the designated database and other undesignated databases, by using the plurality of search keywords. Step S305 is similar to step S104.

In step S306, a determination unit 115 determines whether or not the number of data items matching the plurality of search keywords in the designated database is 0. If it is determined that the number of data items is 0 (Yes in step S306), the process proceeds to step S307. If it is determined that the number of data items is not 0, that is, 1 or more (No in step S306), the process proceeds to step S310.

In step S307, the determination unit 115 determines whether or not the number of data items matching the plurality of search keywords in other databases that are not designated is 0. If it is determined that the number of data items is 0 (Yes in step S307), the process proceeds to step S308. If it is determined that the number of data items is not 0, that is, 1 or more (No in step S307), the process proceeds to step S309.

In step S308, a generation unit 116 generates a response in which a keyword different from the plurality of search keywords is requested. By the time of this step, it is known that the plurality of search keywords cannot be used for further searches in the designated database and other databases, so that the dialogue apparatus 1 generates a "reject( )" command. This command indicates that the plurality of search keywords cannot be accepted, and is an example of a response in which a different keyword is requested. The generated response is stored in the memory 12.

In step S309, the generation unit 116 selects a search keyword included in the plurality of search keywords and having the largest total number of hit items in the other databases as a correct answer keyword and generates a response in which the number of hit items for that correct answer keyword in the other databases is presented. By the time of this step, it is known that the number of hit items in the designated database is 0 and the number of hit items in the other databases is 1 or more, so that the dialogue apparatus 1 generates an "offer(contents)" command. This command is an example of a response in which the number of hit items for the correct answer keyword in the other databases is presented. The generated response is stored in the memory 12.

In step S310, the generation unit 116 selects a search keyword included in the plurality of search key words and having one or more searches in the designated database as a correct answer keyword and generates a response in which the number of hit items for that correct answer keyword is presented. By the time of this step, it is known that the number of hit items in the designated database is equal to or more than 1, so that the dialogue apparatus 1 generates an "offer(contents)" command. This command is an example of a response in which the number of hit items in the designated database is presented. The generated response is stored in the memory 12.

In step S310, where there are a plurality of search keywords corresponding to the correct answer keyword, a search keyword having the highest reliability of voice recognition may be selected from the plurality of search keywords and used as a correct answer keyword. Alternatively, a search keyword having the largest number of hit items in the designated database may be selected from the plurality of search keywords and used as the correct answer keyword. Needless to say, where one or more searches are obtained in the designated database for one of the plurality of search keywords, that search keyword may be used as a correct answer keyword.

In step S311, an output unit 117 outputs the generated response to the user. Step S311 is similar to step S112.

The outline of the operation of the dialogue apparatus 1 according to the second embodiment has been described above. As a specific example, consideration will be given to the case where the user designates database A, and the dialogue apparatus 1 searches the designated database A and database B and database C, which are undesignated databases, by using a plurality of search keywords.

For example, it is assumed that as a result of voice recognition, three candidates "Look for ABC", "Look for ABE" and "Look for ABP" are obtained as user's utterances in descending order of the reliability of voice recognition. The dialogue apparatus 1 extracts "ABC", "ABE" and "ABP" as a plurality of search keywords from the candidates. It is also assumed that the results of searching the databases using the plurality of search keywords are as follows:

select*from databaseA where code like %ABC%→0 select*from databaseB where code like %ABC%→0 select*from databaseC where code like %ABC%→0 select*from databaseA where code like %ABE%→0 select*from databaseB where code like %ABE%→10 select*from databaseC where code like %ABE%→0 select*from databaseA where code like %ABP%→0 select*from databaseB where code like %ABP%→10 select*from databaseC where code like %ABP%→20

For example, the search result "select * from database A where code like % ABC %→0" indicates that "the number of data items including "ABC" as the model number (code) in the database A is 0."

From the above search results, the total number of hit items for each search keyword in the designated database A and the total number of hit items for each search keyword in the other databases B and C are obtained as follows:

$count_A(ABC)=0, count_{B+C}(ABC)=0$ $count_A(ABE)=0, count_{B+C}(ABE)=10$ $count_A(ABP)=0, count_{B+C}(ABP)=30$ For example, "$count_A(ABC)=0$" indicates that the search result of "ABC" in the database A is 0. "$count_{B+C}(ABC)=0$" indicates that the search result of "ABC" in the databases B and C is 0.

From the above search results, it can be seen that the number of hit items for the plurality of search keywords "ABC", "ABE" and "ABP" is 0 in the designated database A, and the number of hit items for the same search keywords is 1 or more in the other databases B and C. Therefore, the processing corresponding to step S309 is performed. Of the plurality of search keywords, the search keyword having the largest total number of hit items in the other databases B and C is "ABP", so that the dialogue apparatus 1 determines "ABP" as a correct answer keyword. Finally, a response in which the number of hit items for "ABP" in the other databases B and C is presented is generated and output to the display device 13. The response is as follows: "ABP was searched for, but nothing was found. Ten searches were found in database B, and 20 searches were found in database C."

According to the second embodiment described above, even if a correct answer keyword cannot be determined from the search results obtained for a plurality of search keywords in the database designated by the user, the search results in other databases can be used to determine the correct answer keyword. That is, flexible dialogue can be promoted, as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dialogue apparatus comprising:
a processing circuit configured to:
designate one database from among a plurality of databases;
acquire text information input by a user;
extract a search keyword required for search from the text information;
search the designated database and another database which is included in the plurality of databases and which is other than the designated database, by using the search keyword;
generate a response in accordance with a first number of hit items, which is a number of data items matching the search keyword in the designated database, and a second number of hit items, which is a number of data items matching the search keyword in said another database; and
output the generated response to the user, wherein when the first number of hit items is zero and the second number of hit items is one or more, the processing circuit generates a response requesting a database different from the designated database.

2. The apparatus according to claim 1, wherein when the first number of hit items is zero and the second number of hit items is zero, the processing circuit generates a response requesting a keyword different from the search keyword.

3. The apparatus according to claim 1, wherein when the first number of hit items is zero and the second number of hit items is one or more, the processing circuit generates a response in which the second number of hit items is presented.

4. The apparatus according to claim 1, wherein when the first number of hit items is one or more and is larger than a threshold value, the processing circuit generates a response requesting a narrowing keyword necessary for narrowing down the first number of hit items, the narrowing keyword is an item to inquire of the user.

5. The apparatus according to claim 4, wherein each of the plurality of databases includes a data table in which a plurality of data items related to the search keyword are defined, the processing circuit is further configured to:
calculate an average information amount for each of the plurality of data items in the data table included in each of the plurality of databases;

calculate a weighted average for the average information amount of each of the plurality of data items, by using a weight determined for each of the plurality of databases;

select a data item included in the plurality of data items and having the largest weighted average of the average information amount; and use the selected data item as the narrowing keyword.

6. The apparatus according to claim 1, wherein the processing circuit is further configured to:

recognize voice information by voice;

convert the voice information into text information;

acquire the text information;

extract a plurality of search keywords from the text information;

search the designated database and said another database, using the plurality of search keywords;

when the number of hit items for the plurality of search keywords in the designated database is zero and the number of hit items for the plurality of search keywords in said another database is one or more, select a search keyword included in the plurality of search keywords and having the largest total number of hit items in said another database as a correct answer keyword; and generate a response in which the number of hit items obtained for the correct answer keyword in said another database is presented.

7. A dialogue method comprising:

designating one database from among a plurality of databases;

acquiring text information input by a user;

extracting a search keyword required for search from the text information;

searching the designated database and another database which is included in the plurality of databases and which is other than the designated database, by using the search keyword;

generating a response in accordance with a first number of hit items, which is a number of data items matching the search keyword in the designated database, and a second number of hit items, which is a number of data items matching the search keyword in said another database; and outputting the generated response to the user, wherein when the first number of hit items is zero and the second number of hit items is one or more, the method generates a response requesting a database different from the designated database.

8. A non-transitory computer readable medium including computer executable instructions, wherein the instructions, when executed by a processor, cause the processor to perform a method comprising:

designating one database from among a plurality of databases;

acquiring text information input by a user;

extracting a search keyword required for search from the text information;

searching the designated database and another database which is included in the plurality of databases and which is other than the designated database, by using the search keyword;

generating a response in accordance with a first number of hit items, which is a number of data items matching the search keyword in the designated database, and a second number of hit items, which is a number of data items matching the search keyword in said another database; and outputting the generated response to the user, wherein when the first number of hit items is zero and the second number of hit items is one or more, the method generates a response requesting a database different from the designated database.

9. The method according to claim 7, wherein when the first number of hit items is zero and the second number of hit items is zero, the method generates a response requesting a keyword different from the search keyword.

10. The non-transitory computer readable medium according to claim 8, wherein when the first number of hit items is zero and the second number of hit items is zero, the method generates a response requesting a keyword different from the search keyword.

11. The method according to claim 7, wherein when the first number of hit items is zero and the second number of hit items is one or more, the method generates a response in which the second number of hit items is presented.

12. The non-transitory computer readable medium according to claim 8, wherein when the first number of hit items is zero and the second number of hit items is one or more, the method generates a response in which the second number of hit items is presented.

13. The method according to claim 7, wherein when the first number of hit items is one or more and is larger than a threshold value, the method generates a response requesting a narrowing keyword necessary for narrowing down the first number of hit items, the narrowing keyword is an item to inquire of the user.

14. The non-transitory computer readable medium according to claim 8, wherein when the first number of hit items is one or more and is larger than a threshold value, the method generates a response requesting a narrowing keyword necessary for narrowing down the first number of hit items, the narrowing keyword is an item to inquire of the user.

15. The method according to claim 13, wherein each of the plurality of databases includes a data table in which a plurality of data items related to the search keyword are defined, the method further comprises:

calculating an average information amount for each of the plurality of data items in the data table included in each of the plurality of databases;

calculating a weighted average for the average information amount of each of the plurality of data items, by using a weight determined for each of the plurality of databases;

selecting a data item included in the plurality of data items and having the largest weighted average of the average information amount; and using the selected data item as the narrowing keyword.

16. The non-transitory computer readable medium according to claim 14, wherein each of the plurality of databases includes a data table in which a plurality of data items related to the search keyword are defined, the method further comprises:

calculating an average information amount for each of the plurality of data items in the data table included in each of the plurality of databases;

calculating a weighted average for the average information amount of each of the plurality of data items, by using a weight determined for each of the plurality of databases;

selecting a data item included in the plurality of data items and having the largest weighted average of the average information amount; and using the selected data item as the narrowing keyword.

17. The method according to claim 7, wherein the method further comprises:

recognizing voice information by voice;

converting the voice information into text information;

acquiring the text information;

extracting a plurality of search keywords from the text information;

searching the designated database and said another database, using the plurality of search keywords;

when the number of hit items for the plurality of search keywords in the designated database is zero and the number of hit items for the plurality of search keywords in said another database is one or more, selecting a search keyword included in the plurality of search keywords and having the largest total number of hit items in said another database as a correct answer keyword; and generating a response in which the number of hit items obtained for the correct answer keyword in said another database is presented.

18. The non-transitory computer readable medium according to claim 8, wherein the method further comprises:

recognizing voice information by voice;

converting the voice information into text information;

acquiring the text information;

extracting a plurality of search keywords from the text information;

searching the designated database and said another database, using the plurality of search keywords;

when the number of hit items for the plurality of search keywords in the designated database is zero and the number of hit items for the plurality of search keywords in said another database is one or more, selecting a search keyword included in the plurality of search keywords and having the largest total number of hit items in said another database as a correct answer keyword; and generating a response in which the number of hit items obtained for the correct answer keyword in said another database is presented.

\* \* \* \* \*